(12) United States Patent
Puiu

(10) Patent No.: US 7,338,403 B2
(45) Date of Patent: Mar. 4, 2008

(54) TORQUE COUPLING WITH POWER-OPERATED CLUTCH ACTUATOR

(75) Inventor: Dumitru Puiu, Sterling Heights, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 197 days.

(21) Appl. No.: 10/930,033

(22) Filed: Aug. 30, 2004

(65) Prior Publication Data
US 2006/0046888 A1 Mar. 2, 2006

(51) Int. Cl.
*F16H 48/20* (2006.01)
*F16D 13/04* (2006.01)

(52) U.S. Cl. .......................... 475/223; 192/35
(58) Field of Classification Search ............... 192/84.6, 192/84.7, 35, 93 A, 99 A, 83 R, 99 S; 180/247, 180/223; 475/210–213, 223, 225; 74/665 F, 74/665 G See application file for complete search history.

(56) References Cited

U.S. PATENT DOCUMENTS

| | | | |
|---|---|---|---|
| 4,805,486 A | 2/1989 | Hagiwara et al. | |
| 4,862,769 A | 9/1989 | Koga et al. | |
| 4,895,236 A | 1/1990 | Sakakibara et al. | |
| 4,976,347 A | 12/1990 | Sakakibara et al. | |
| 5,007,886 A | 4/1991 | Holmquist et al. | |
| 5,119,298 A | 6/1992 | Naito | |
| 5,224,906 A | 7/1993 | Sturm | |
| 5,323,871 A | 6/1994 | Wilson et al. | |
| 5,400,866 A * | 3/1995 | Wilson et al. | 180/197 |
| 5,407,024 A | 4/1995 | Watson et al. | |
| 5,423,235 A | 6/1995 | Botterill et al. | |
| 5,584,776 A * | 12/1996 | Weilant et al. | 475/213 |
| 6,101,897 A * | 8/2000 | Showalter | 74/665 GE |
| 6,109,408 A * | 8/2000 | Ikeda et al. | 192/35 |
| 6,158,561 A | 12/2000 | Sakai et al. | |
| 6,283,887 B1 | 9/2001 | Brown et al. | |
| 6,398,686 B1 | 6/2002 | Irwin | |
| 6,478,708 B2 | 11/2002 | Krisher | |
| 6,484,857 B2 | 11/2002 | Vonnegut et al. | |
| 6,520,880 B1 | 2/2003 | Fukushima et al. | |
| 6,595,338 B2 | 7/2003 | Bansbach et al. | |
| 6,641,267 B2 | 11/2003 | Ohishi et al. | |
| 6,645,109 B2 | 11/2003 | Williams et al. | |
| 6,691,845 B2 | 2/2004 | Showalter | |
| 6,766,889 B1 | 7/2004 | Pennycuff | |
| 6,802,794 B2 * | 10/2004 | Showalter | 475/269 |
| 6,808,037 B1 | 10/2004 | Mueller | |

(Continued)

FOREIGN PATENT DOCUMENTS

DE 3908478 A1 5/1989

(Continued)

*Primary Examiner*—Roger Pang
(74) *Attorney, Agent, or Firm*—Harness, Dickey & Pierce, P.L.C.

(57) ABSTRACT

A torque transfer mechanism and a control system are disclosed for adaptively controlling the transfer of drive torque between first and second rotary members in a power transmission device of the type used in motor vehicle driveline applications. The torque transfer mechanism includes a main clutch assembly operably disposed between the first and second rotary members, a pilot clutch assembly and a clutch operator assembly. The clutch operator assembly includes a rotary cam driven by an electric motor and a pivotal mode fork.

14 Claims, 12 Drawing Sheets

U.S. PATENT DOCUMENTS

| | | |
|---|---|---|
| 6,808,052 B2 | 10/2004 | Kirkwood et al. |
| 6,837,351 B2 * | 1/2005 | Showalter et al. ............ 192/35 |
| 6,964,315 B2 * | 11/2005 | Mueller ...................... 180/247 |
| 2003/0094343 A1 * | 5/2003 | Showalter .................... 192/35 |
| 2004/0188213 A1 * | 9/2004 | Pennycuff .................... 192/35 |
| 2004/0238311 A1 * | 12/2004 | Parigger ................... 192/84.6 |
| 2005/0034950 A1 * | 2/2005 | Kowalsky et al. ............ 192/35 |

FOREIGN PATENT DOCUMENTS

| | | |
|---|---|---|
| JP | 62-18117 | 1/1990 |
| JP | 63-66927 | 3/1990 |

* cited by examiner

TORQUE COUPLING WITH POWER-OPERATED CLUTCH ACTUATOR

FIELD OF THE INVENTION

The present invention relates generally to power transfer systems for controlling the distribution of drive torque between the front and rear drivelines of a four-wheel drive vehicle and/or the left and right wheels of an axle assembly. More particularly, the present invention is directed to a power transmission device for use in motor vehicle driveline applications having a torque transfer mechanism equipped with a power-operated clutch actuator that is operable for controlling actuation of a multi-plate friction clutch.

BACKGROUND OF THE INVENTION

In view of increased demand for four-wheel drive vehicles, a plethora of power transfer systems are currently being incorporated into vehicular driveline applications for transferring drive torque to the wheels. In many vehicles, a power transmission device is operably installed between the primary and secondary drivelines. Such power transmission devices are typically equipped with a torque transfer mechanism for selectively and/or automatically transferring drive torque from the primary driveline to the secondary driveline to establish a four-wheel drive mode of operation. For example, the torque transfer mechanism can include a dog-type lock-up clutch that can be selectively engaged for rigidly coupling the secondary driveline to the primary driveline to establish a "part-time" four-wheel drive mode. When the lock-up clutch is released, drive torque is only delivered to the primary driveline for establishing a two-wheel drive mode.

A modern trend in four-wheel drive motor vehicles is to equip the power transmission device with an adaptively controlled transfer clutch in place of the lock-up clutch. The transfer clutch is operable for automatically directing drive torque to the secondary wheels, without any input or action on the part of the vehicle operator, when traction is lost at the primary wheels for establishing an "on-demand" four-wheel drive mode. Typically, the transfer clutch includes a multi-plate clutch assembly that is installed between the primary and secondary drivelines and a clutch actuator for generating a clutch engagement force that is applied to the clutch assembly. The clutch actuator can be a power-operated device that is actuated in response to electric control signals sent from an electronic controller unit (ECU). The electric control signals are typically based on changes in current operating characteristics of the vehicle (i.e., vehicle speed, interaxle speed difference, acceleration, steering angle, etc.;) as detected by various sensors. Thus, such "on-demand" transfer clutch can utilize adaptive control schemes for automatically controlling torque distribution during all types of driving and road conditions. Such adaptively controlled transfer clutches can also be used in association with a center differential operably installed between the primary and secondary drivelines for automatically controlling interaxle slip and torque biasing in a full-time four-wheel drive application.

A large number of adaptively controlled transfer clutches have been developed with an electro-mechanical clutch actuator that can regulate the amount of drive torque transferred to the secondary driveline as a function of the electric control signal applied thereto. In some applications, the transfer clutch employs an electromagnetic clutch as the power-operated clutch actuator. For example, U.S. Pat. No. 5,407,024 discloses a electromagnetic coil that is incrementally activated to control movement of a ball-ramp drive assembly for applying a clutch engagement force to the multi-plate clutch assembly. Likewise, Japanese Laid-open Patent Application No. 62-18117 discloses a transfer clutch equipped with an electromagnetic clutch actuator for directly controlling actuation of the multi-plate clutch pack assembly. Also, U.S. Pat. No. 6,158,561 discloses use of an electromagnetic actuator for engaging a pilot clutch which, in turn, controls energization of a ballramp unit for engaging the main clutch.

As an alternative to such electromagnetic clutch actuation systems, the transfer clutch can employ an electric motor and a mechanical drive assembly as the power-operated clutch actuator. For example, U.S. Pat. No. 5,323,871 discloses a transfer clutch equipped with an electric motor that controls rotation of a sector plate which, in turn, controls pivotal movement of a lever arm that is operable for applying the clutch engagement force to the multi-plate clutch assembly. Likewise, Japanese Laid-open Patent Application No. 63-66927 discloses a transfer clutch which uses an electric motor to rotate one cam plate of a ball-ramp operator for engaging the multi-plate clutch assembly. Finally, U.S. Pat. Nos. 4,895,236 and 5,423,235 respectively disclose a transfer clutch having an electric motor which drives a reduction gearset for controlling movement of a ball screw operator and a ball-ramp operator which, in turn, apply the clutch engagement force to the clutch assembly.

In contrast to the electro-mechanical clutch actuators discussed above, it is also well known to equip the transfer clutch with an electro-hydraulic clutch actuator. For example, U.S. Pat. Nos. 4,862,769 and 5,224,906 generally disclose use of an electric motor or solenoid to control the fluid pressure exerted by an apply piston on a multi-plate clutch assembly. In addition, U.S. Pat. No. 6,520,880 discloses a hydraulic actuation system for controlling the fluid pressure supplied to a hydraulic motor arranged which is associated with a differential gear mechanism in a drive axle assembly.

While many adaptive clutch actuation systems similar to those described above are currently used in four-wheel drive vehicles, a need exists to advance the technology and address recognized system limitations. For example, the size and weight of the friction clutch components and the electrical power requirements of the clutch actuator needed to provide the large clutch engagement loads make many systems cost prohibitive for use in most four-wheel drive vehicle applications. In an effort to address these concerns, new technologies are being developed for use in power-operated clutch actuator applications.

SUMMARY OF THE INVENTION

Thus, its is an objective of the present invention to provide a power transmission device for use in a motor vehicle having a torque transfer mechanism equipped with a unique power-operated clutch actuator that is operable to control engagement of a multi-plate clutch assembly.

As a related objective of the present invention, the torque transfer mechanism is well-suited for use in motor vehicle driveline applications to control the transfer of drive torque between first and second rotary members.

According to each preferred embodiment of the present invention, a torque transfer mechanism and a control system are disclosed for adaptively controlling the transfer of drive torque between first and second rotary members in a power transmission device of the type used in motor vehicle driveline applications. The torque transfer mechanism includes a main clutch assembly operably disposed between the first and second rotary members, a pilot clutch assembly and a clutch operator assembly. The clutch operator assembly includes a rotary cam and a pivotal mode fork. During operation, the control system functions to control the amount and direction of angular movement of the rotary cam. Such angular movement of the rotary cam causes corresponding pivotal movement of the mode fork for actuating the pilot clutch assembly. Such actuation of the pilot clutch assembly functions to control the magnitude of a compressive clutch engagement force that is applied to the main clutch assembly, thereby controlling the drive torque transferred from the first rotary member to the second rotary member.

According to another feature of the present invention, the control system includes an electric motor for driving the rotary cam, vehicle sensors for detecting various operating characteristics of the motor vehicle and an electronic control unit (ECU) for receiving input signals from the vehicle sensors and controlling energization of the electric motor.

The torque transfer mechanism of the present invention is adapted for use in a power transmission device for adaptively controlling the drive torque transferred between a primary driveline and a secondary driveline. According to one preferred application, the power transmission device of the present invention is a transfer case with the torque transfer mechanism arranged as a torque transfer coupling for providing on-demand torque transfer from the primary driveline to the secondary driveline. In a related application, the torque transfer mechanism is arranged as a torque bias coupling for varying the torque distribution and limiting interaxle slip between the primary and secondary driveline. According to another preferred application, the power transmission device is a drive axle assembly with the torque transfer mechanism arranged as a torque bias coupling to control speed differentiation and torque distribution across a differential unit.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to a torque transfer mechanism that can be adaptively controlled for modulating the torque transferred from a first rotary member to a second rotary member. The torque transfer mechanism finds particular application in power transmission devices for use in motor vehicle drivelines such as, for example, a torque transfer clutch in a transfer case, a power take-off unit or an in-line torque coupling, a torque biasing clutch associated with a differential unit in full-time transfer cases or power take-off units or in a drive axle assembly, or any other possible torque transfer application. Thus, while the present invention is hereinafter described in association with particular power transmission devices for use in specific driveline applications, it will be understood that the arrangements shown and described are merely intended to illustrate embodiments of the present invention.

Figure 1:
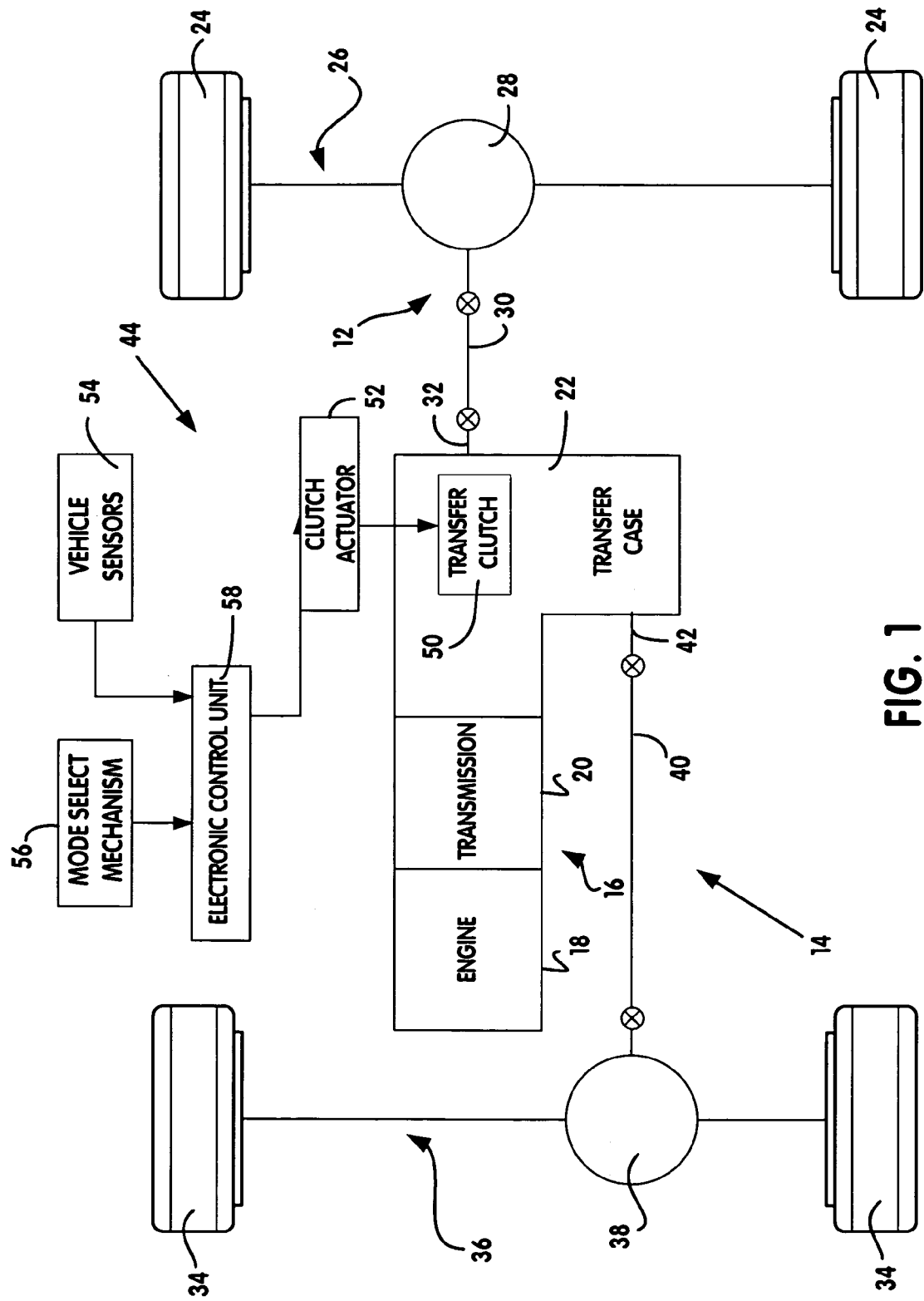
FIG. 1 illustrates the drivetrain of a four-wheel drive vehicle equipped with a power transmission device according to the present invention.

With particular reference to FIG. 1 of the drawings, a drivetrain 10 for a four-wheel drive vehicle is shown. Drivetrain 10 includes a primary driveline 12, a secondary driveline 14, and a powertrain 16 for delivering rotary tractive power (i.e., drive torque) to the drivelines. In the particular arrangement shown, primary driveline 12 is the rear driveline while secondary driveline 14 is the front driveline. Powertrain 16 includes an engine 18, a multi-speed transmission 20, and a power transmission device hereinafter referred to as transfer case 22. Rear driveline 12 includes a pair of rear wheels 24 connected at opposite ends of a rear axle assembly 26 having a rear differential 28 coupled to one end of a rear prop shaft 30, the opposite end of which is coupled to a rear output shaft 32 of transfer case 22. Likewise, front driveline 14 includes a pair of front wheels 34 connected at opposite ends of a front axle assembly 36 having a front differential 38 coupled to one end of a front prop shaft 40, the opposite end of which is coupled to a front prop shaft 42 of transfer case 22.

With continued reference to the drawings, drivetrain 10 is shown to further include an electronically-controlled power transfer system 44 for permitting a vehicle operator to select between a two-wheel drive mode, a locked ("part-time") four-wheel drive mode, and an adaptive ("on-demand") four-wheel drive mode. In this regard, transfer case 22 is equipped with a transfer clutch 50 that can be selectively actuated for transferring drive torque from rear output shaft 32 to front output shaft 42 for establishing both of the part-time and on-demand four-wheel drive modes. Power transfer system 44 further includes an electromechanical clutch actuator 52 for actuating transfer clutch 50, vehicle sensors 54 for detecting certain dynamic and operational characteristics of the motor vehicle, a mode select mechanism 56 for permitting the vehicle operator to select one of the available drive modes, and an electronic control unit (ECU) 58 for controlling actuation of clutch actuator 52 in response to input signals from vehicle sensors 54 and mode selector 56.

Figure 2:
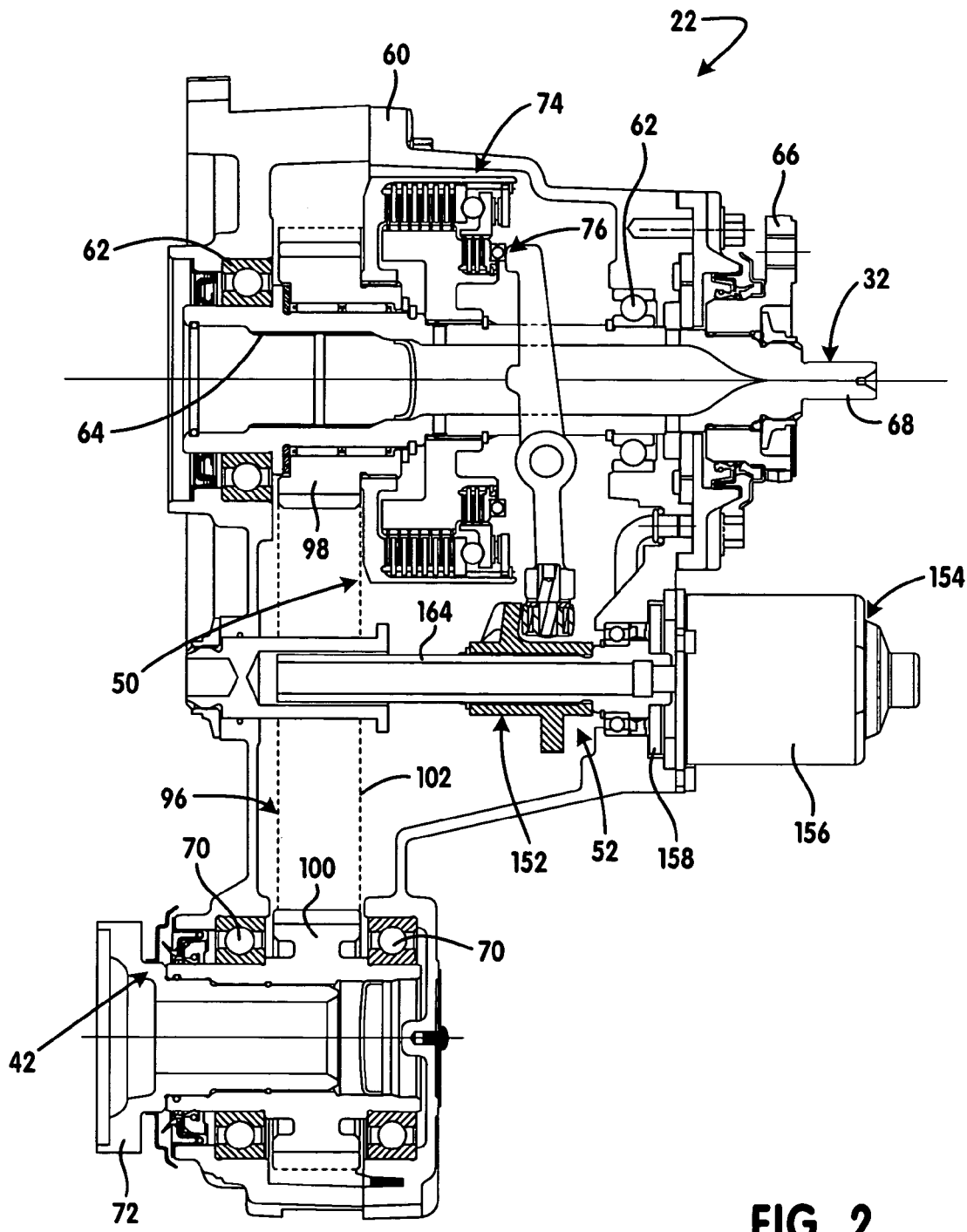
FIG. 2 is a sectional view of a transfer case associated with the drivetrain shown in FIG. 1 and which is equipped with a torque transfer mechanism according to a preferred embodiment of the present invention.

Transfer case 22 is shown in FIG. 2 to include a multi-piece housing 60 from which rear output shaft 32 is rotatably supported by a pair of laterally-spaced bearing assemblies 62. Rear output shaft 32 includes an internally-splined first end segment 64 adapted for connection to the output shaft of transmission 20 and a yoke assembly 66 secured to its second end segment 68 that is adapted for connection to rear propshaft 30. Front output shaft 42 is likewise rotatably supported from housing 60 by a pair of laterally-spaced bearing assemblies 70 and includes a yoke-type end segment 72 that is adapted for connection to front propshaft 40.

In general, transfer clutch 50 and electromechanical clutch actuator 52 define a torque transfer mechanism according to the preferred embodiment of the present invention. Transfer clutch 50 includes a main clutch assembly 74 and a pilot clutch assembly 76. Main clutch assembly 74 is shown to include a multi-plate friction clutch 78 and a ballramp unit 80. Likewise, pilot clutch assembly 76 is shown to include a multi-plate friction clutch 82 and a thrust bearing unit 84. Friction clutch 78 includes a hub 86 fixed (i.e., splined) for rotation with rear output shaft 32, a drum 88 and a multi-plate clutch pack 90 that is operably disposed between hub 84 and drum 88. Clutch pack 90 includes a set of outer clutch plates 92 splined for rotation with drum 88 and which are interleaved with a set of inner clutch plates 94 splined for rotation with hub 84. As will be detailed, clutch actuator 52 is operable for causing a compressive clutch engagement force to be exerted on clutch pack 90. Such engagement of clutch pack 90 causes rotary power ("drive torque") to be transferred from rear output shaft 32 to front output shaft 42 through a transfer assembly 96. Transfer assembly 96 includes a first sprocket 98 fixed (i.e., splined) for rotation with drum 88, a second sprocket 100 fixed (i.e., splined) for rotation with front output shaft 42, and a power chain 102 encircling sprockets 98 and 100. First sprocket 98 is shown splined to an end plate segment 104 of drum 88 and is rotatably supported on rear output shaft 32 via a suitable bearing assembly 106. A thrust bearing 108 is shown disposed between first sprocket 102 and a lock ring 109 fixed to rear output shaft 32.

Ballramp unit 80 includes a first cam member 110, a second cam member 112, and rollers 114. First cam member 110 is splined for common rotation with drum 88 and bi-directional translational movement relative to clutch pack 90. Specifically, first cam member 110 is axially moveable between a first or "released" position and a second or "locked" position. In its released position, first cam member exerts a minimum clutch engagement force on clutch pack 90 such that virtually no drive torque is transferred from rear output shaft 32 to front output shaft 42, thereby establishing the two-wheel drive mode. In contrast, movement of first cam member 110 to its locked position causes a maximum clutch engagement force to be exerted on clutch pack 90 such that front output shaft 42 is, in effect, coupled for common rotation with rear output shaft 32, thereby establishing the part-time four-wheel drive mode. Accordingly, variable control of the movement of first cam member 110 between its released and locked position results in adaptive regulation of the drive torque transferred to front output shaft 42, thereby establishing the on-demand four-wheel drive mode.

Second cam member 112 of ballramp unit 80 is operably connected to second friction clutch 82. In addition, rollers 114 are disposed in cam channels defined between first cam tracks 116 formed in first cam member 110 and second cam tracks 118 formed in second cam member 112. Preferably, a plurality of such cam channels are provided which are each configured as an oblique section of a helical torus. Balls 114 and cam tracks 116,118 may be replaced with alternative components and/or tapered ramp profiles that functions to cause axial movement of first cam member 110 in response to relative angular movement between the cam members. In any arrangement, the load transferring components can not be self-locking or self-engaging so as to permit fine control over the translational movement of first cam member 110 for providing precise control of the clutch engagement force applied to clutch pack 90. A thrust bearing assembly 120 is disposed between second cam member 112 and a retainer plate 122 that is splined to drum 88. A lock ring 124 axially locates retainer plate 122 for preventing axial movement of second cam member 112.

Second friction clutch 82 includes a multi-plate clutch pack 128 that is operably disposed between second cam member 112 of ballramp unit 80 and hub 86 of first friction clutch 78. Clutch pack 128 includes a set of outer plates 130 splined for rotation with second cam member 112 and which are interleaved with a set of inner clutch plates 132 splined for rotation with hub 86. Thrust bearing unit 84 includes a first thrust ring 134, a second thrust ring 136 and rollers 138. First thrust ring 134 is fixed to a pressure plate 140 which, in turn, is splined for rotation with hub 86 of first friction clutch 78. Rollers 138 are disposed in roller channels defined between first thrust ring 136 and second thrust ring 136. Bi-directional axial movement of thrust bearing unit 84 permits accurate control of bi-directional translational movement of pressure plate 140 relative to clutch pack 128. Such translational movement of pressure plate 140 is operable for controlling the magnitude of pilot actuation force exerted on clutch pack 128 which, in turn, controls energization of ballramp unit 80. With pressure plate 140 in a first or "retracted" position, a minimum pilot actuation force is exerted on clutch pack 128 such that first and second cam members of ballramp unit 80 are permitted to rotate together, thereby maintaining first cam member 110 in its released position. In contrast, movement of pressure plate 140 to a second or "extended" position causes a maximum pilot actuation force to be exerted on clutch pack 128 which, in turn, causes second cam member 112 to rotate relative to first cam member 110. Such relative rotation results in axial movement of first cam member 110 to its locked position.

Ballramp unit 80 further includes a torsional return spring (not shown) that is operably connected between first cam member 110 and second cam member 112. The return spring functions to angularly bias the cam members for moving first cam member 110 toward its released position so as to de-energize ballramp unit 80. Such angular movement between the cam members due to the biasing of the return spring also results in rearward translation of first thrust ring 134 toward its retracted position for de-energizing pilot clutch 82.

To provide means for moving pressure plate 140 between its retracted and extended positions, clutch actuator 52 generally includes a clutch operator assembly 152 and an electric power unit 154. Power unit 154 is secured to housing 60 and includes an electric motor 156 and a rotary position sensor, such as an encoder 158. Clutch operator assembly 152 is shown to include a rotary drive mechanism 160 and a pivotal mode fork 162. Drive mechanism 160 includes a drive shaft 164 having a first end segment 166 fixed via a spline connection 168 for rotation with a rotary output shaft 170 of electric motor 156. As seen, first end segment 166 is rotatably supported by a bearing assembly 171 while a second end segment 172 of drive shaft 164 is rotatably supported in a guide sleeve 174 which, in turn, is fixed via a lock nut 176 to a portion of housing 60. A rotary cam 178 has a tubular hub segment 180 fixed via a spline connection 182 for rotation with drive shaft 164 and is axially restrained thereon via engagement at one end with a shoulder segment 184 and at its opposite end via lock ring 186. In addition, rotary cam 178 further includes an upstanding cam segment 188 that defines a cam surface 190.

Figure 3:
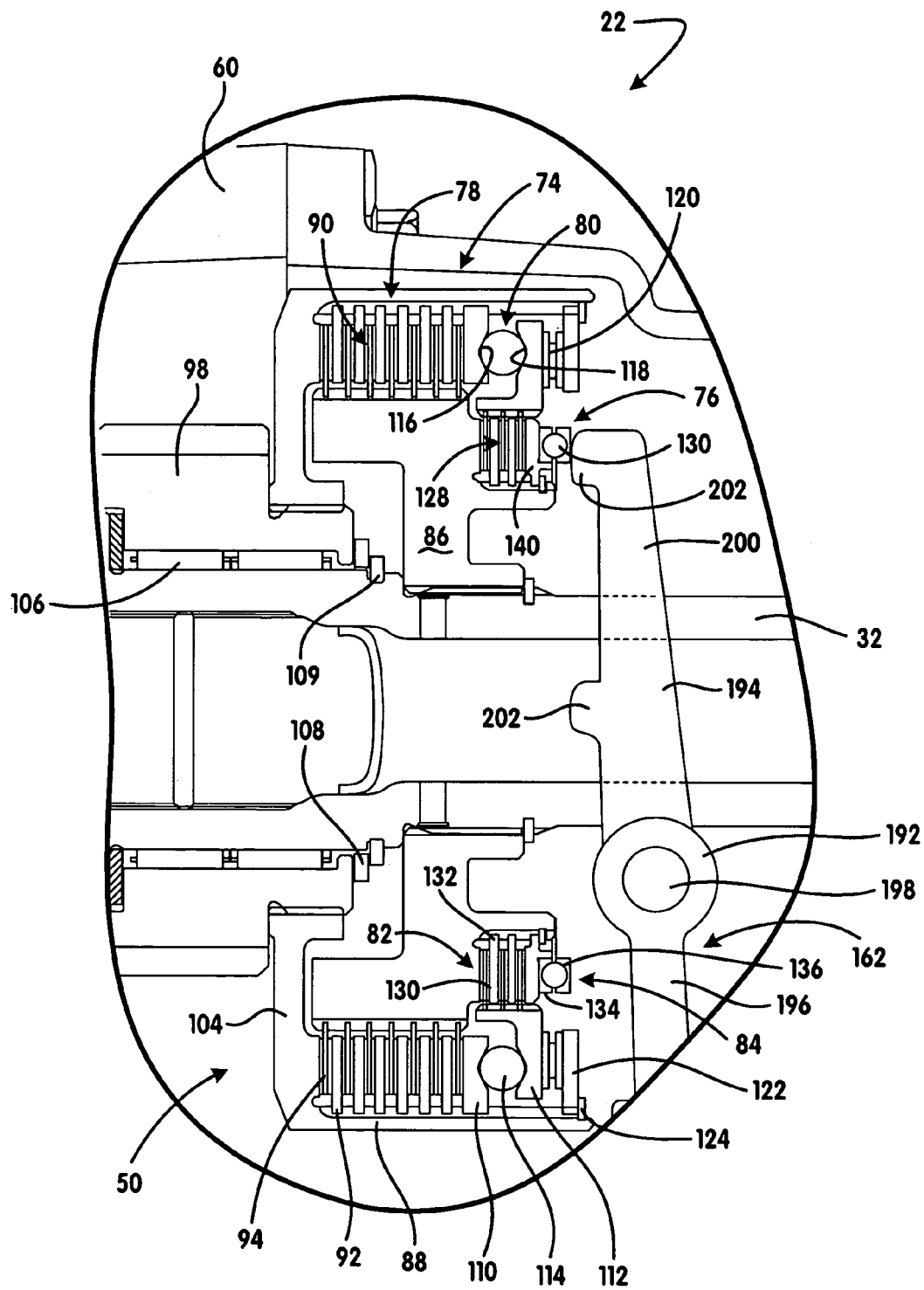
FIGS. 3 and 4 are enlarged partial views taken from FIG. 2 showing components of the torque transfer mechanism is greater detail.
Figure 4:
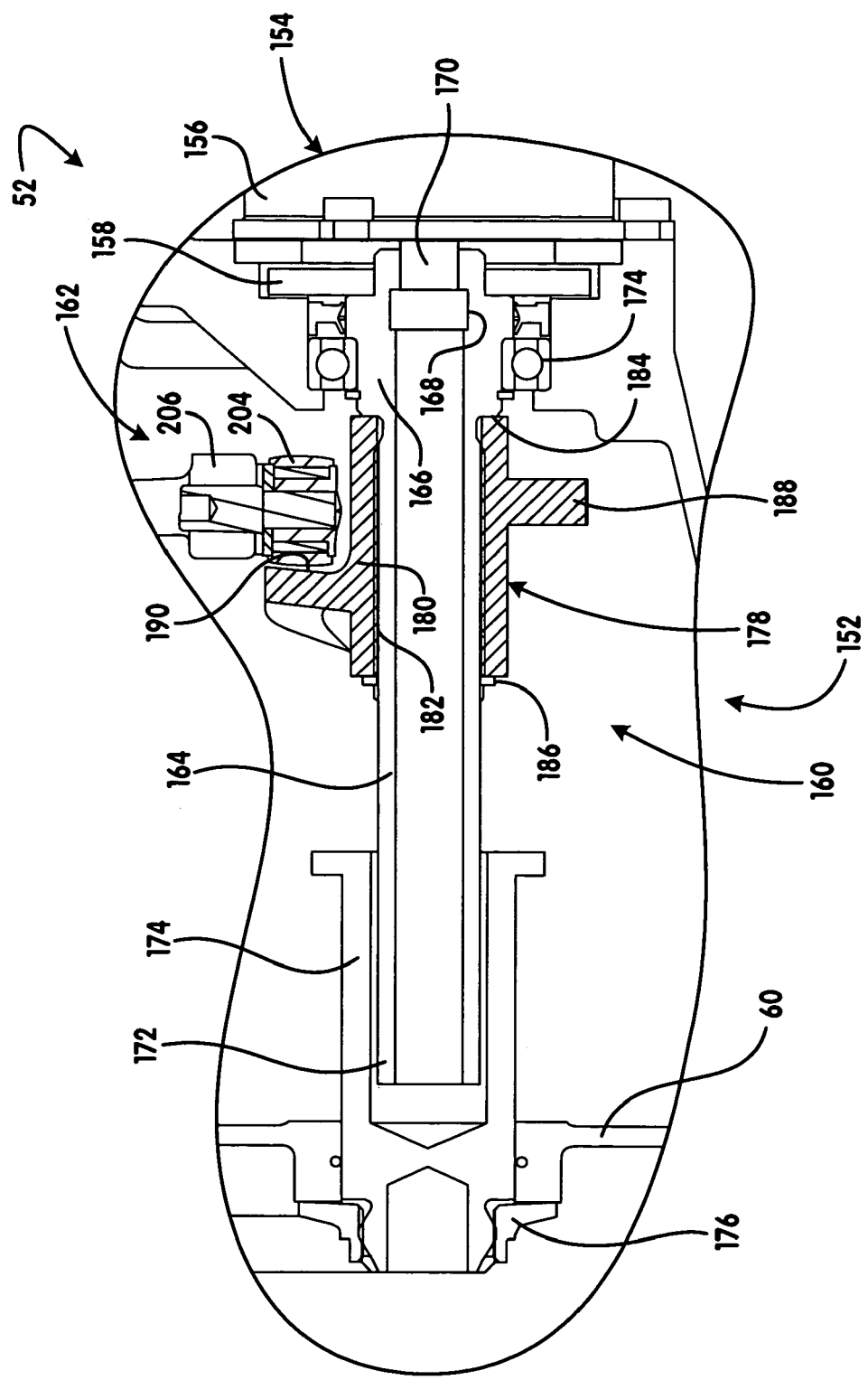

As best seen from FIGS. 3 and 4, mode fork 162 is shown to include a hub segment 192, a fork segment 194 and a lever segment 196. Hub segment 192 is journalled on a pivot shaft 198 secured to housing 60 so as to permit pivotal movement of fork segment 194 relative to pilot clutch assembly 82 and pivotal movement of lever segment 196 relative to rotary cam 178. Fork segment 194 has a pair of tang members 200 that are laterally offset to surround rear output shaft 32. Each tang member 200 includes at least two lugs 202 that are maintained in engagement with second thrust ring 136. In addition, a roller assembly 204 is mounted to a terminal end 206 of lever segment 196 and is maintained in rolling engagement with cam surface 190 on cam segment 188 of rotary cam 178.

In operation, actuation of motor 156 causes rotary cam 178 to rotate in a first direction which, in turn, results in corresponding pivotal movement of mode fork 162 for moving thrust bearing unit 84 from its retracted position toward its extended position. Accordingly, the resultant amount of forward axial movement of first thrust ring 134 causes pressure plate 140 to exert a corresponding pilot actuation force on clutch pack 128. Engagement of clutch pack 128 effectively couples second cam member 112 of ballramp unit 80 for rotation with hub 86 and rear output shaft 32. This action results it relative rotation between cam members 110 and 112 and which, in turn, results in translational movement of first cam member 110 toward its locked position.

With pressure plate 140 in its retracted position, first cam member 110 is located in its released position such that virtually no drive torque is transferred from rear output shaft 32 to front output shaft 42 through transfer clutch 50, thereby effectively establishing the two-wheel drive mode. In contrast, movement of pressure plate 140 to its extended position causes corresponding movement of cam member 110 to its locked position. As such, a maximum amount of drive torque is transferred to front output shaft 42 for, in effect, coupling front output shaft 42 for common rotation with rear output shaft 32, thereby establishing the part-time four-wheel drive mode. Accordingly, controlling the position of pressure plate 140 between its retracted and extended positions relative to clutch pack 128 permits variable control of the amount of drive torque transferred from rear output shaft 32 to front output shaft 42, thereby establishing the on-demand four-wheel drive mode. Thus, the control signals supplied to electric motor 156 control the angular position of rotary cam 178 for controlling the pivoted position of mode fork 162 and, in turn, the axial movement of pressure plate 140 between its retracted and extended positions.

ECU 58 sends electrical control signals to electric motor 156 for accurately controlling the rotated position of rotary cam 178 by utilizing a predefined control strategy that is based on the mode signal from mode selector 56 and the sensor input signals from vehicle sensors 54. Encoder 158 sends a signal to ECU 58 that is indicative of the rotated position of rotary cam 178. In operation, if the two-wheel drive mode is selected, motor 156 drives rotary cam 178 in its second direction until pressure plate 140 is permitted to return to its retracted position. With pilot clutch 82 released, ballramp unit 80 is de-energized such that main clutch 78 is also released. In contrast, upon selection of the part-time four-wheel drive mode, motor 156 drives rotary cam 178 until pressure plate 140 is located in its extended position for fully engaging pilot clutch 82. As such, ballramp unit 80 is energized to move first cam member 110 to its locked position for fully engaging main friction clutch 78.

When mode selector 52 indicates selection of the on-demand four-wheel drive mode, ECU 58 energizes motor 156 for initially rotating cam 178 until pressure plate 140 is located in an intermediate or "ready" position which, in turn, results in ballramp unit 80 moving first cam member 110 from its released position to a "stand-by" position. Accordingly, a predetermined minimum amount of drive torque is delivered to front output shaft 42 through transfer clutch 50 in this adapt-ready condition. Thereafter, ECU 58 determines when and how much drive torque needs to be transferred to front output shaft 42 based on the current tractive conditions and/or operating characteristics of the motor vehicle, as detected by sensors 54. Sensors 54 detect such parameters as, for example, the rotary speed of the output shafts, the vehicle speed and/or acceleration, the transmission gear, the on/off status of the brakes, the steering angle, the road conditions, etc. Such sensor signals are used by ECU 58 to determine a desired output torque value utilizing a control scheme that is incorporated into ECU 58. This desired torque value is used to actively control actuation of electric motor 156 to generate a rotated position of rotary cam 178.

In addition to adaptive torque control, the present invention permits release of transfer clutch 50 in the event of an ABS braking condition or during the occurrence of an over-temperature condition. Furthermore, while the control scheme was described based on an on-demand strategy, it is contemplated that a differential or "mimic" control strategy could likewise be used. Specifically, the torque distribution between rear output shaft 32 and front output shaft 42 can be controlled to maintain a predetermined rear/front ratio (i.e., 70:30, 50:50, etc.) so as to simulate the inter-axle torque splitting feature typically provided by a mechanical differential unit. Regardless of the control strategy used, accurate control of the angular position of rotary cam 178 will result in the desired torque transfer characteristics across transfer clutch 50. Furthermore, it should be understood that mode select mechanism 56 could also be arranged to permit selection of only two different drive modes, namely the on-demand 4WD mode and the part-time 4WD mode. Alternatively, mode select mechanism 56 could be eliminated such that the on-demand 4WD mode is always operating in a manner that is transparent to the vehicle operator.

Figure 5:
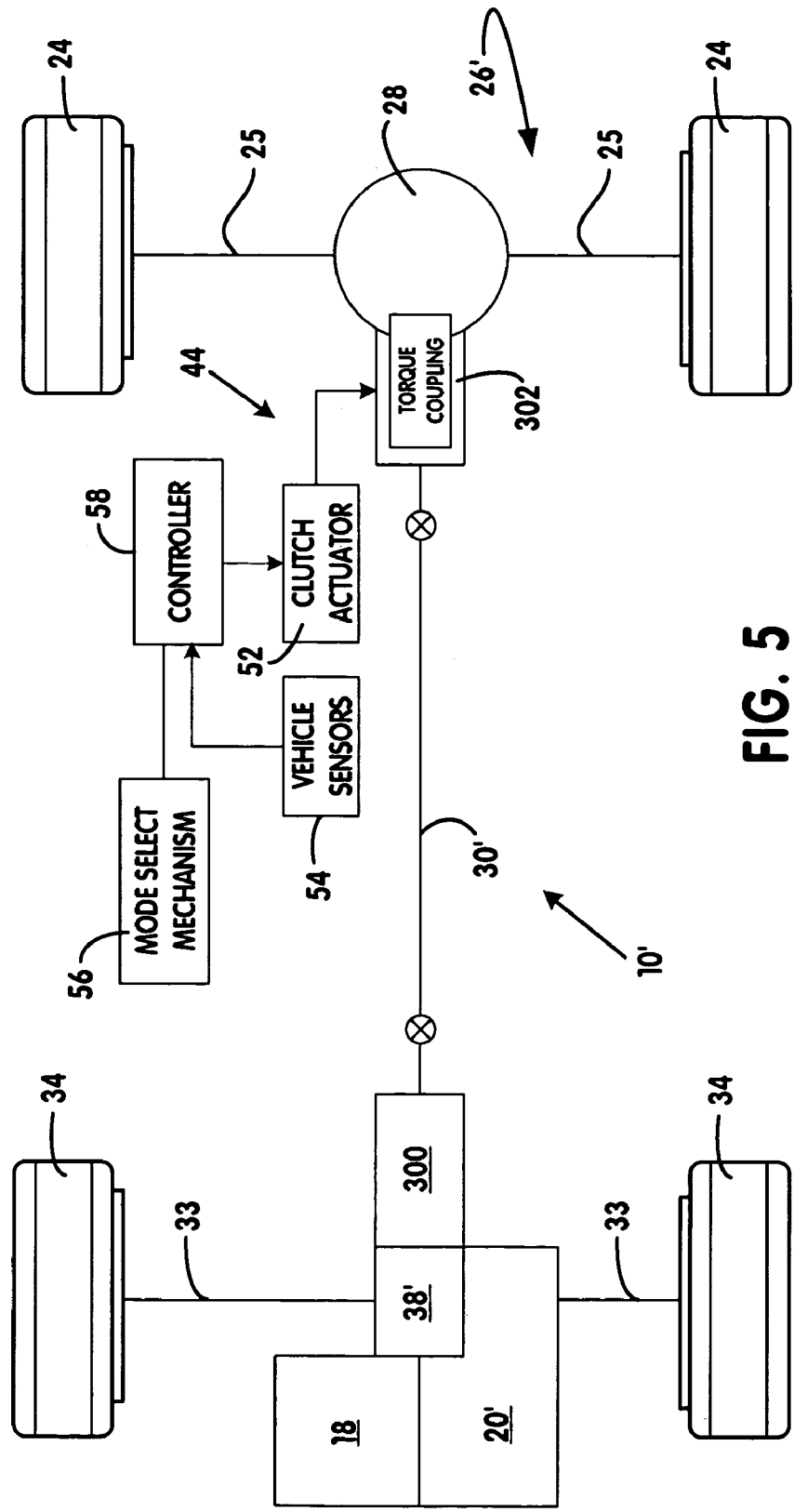
FIG. 5 is a schematic illustration of an alternative driveline for a four-wheel drive motor vehicle equipped with a power transmission device of the present invention.

To illustrate an alternative power transmission device to which the present invention is applicable, FIG. 5 schematically depicts a front-wheel based four-wheel drivetrain layout 10' for a motor vehicle. In particular, engine 18 drives a multi-speed transmission 20' having an integrated front differential unit 38' for driving front wheels 34 via axle shafts 33. A transfer unit or power take-off unit (PTU) 300 is also driven by transmission 20' for delivering drive torque to the input member of a torque transfer mechanism, such as an in-line torque transfer coupling 302, via a drive shaft 30'. Torque transfer coupling 302 is preferably integrated with the components of conventional axle assembly 26 to define a drive axle assembly 26'. In particular, the input member of torque coupling 302 is coupled to drive shaft 30' while its output member is coupled to a drive component of rear differential 28 which, in turn, drives rear wheels 24 via axleshafts 25. Accordingly, when sensors 54 indicate the occurrence of a front wheel slip condition, ECU 58 adaptively controls actuation of torque coupling 302 such that drive torque is delivered "on-demand" to rear wheels 24. It is contemplated that torque transfer coupling 302 includes a transfer clutch and an electromechanical clutch actuator that are similar in both structure and function to the torque transfer mechanism previously described herein. Accordingly, common reference numerals will be used hereinafter to identify components previously described.

Figure 6:
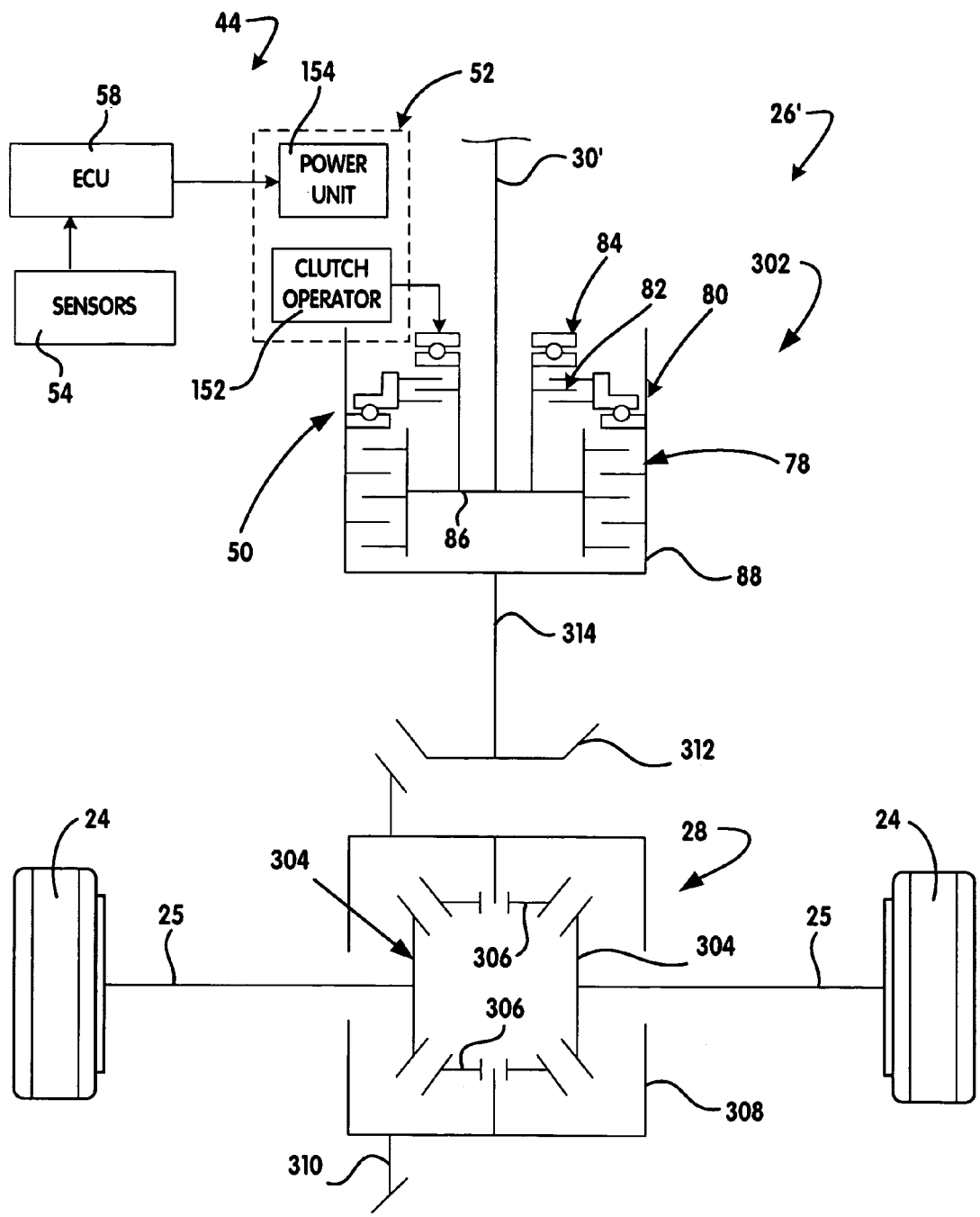
FIG. 6 is a schematic illustration of a drive axle assembly associated with the drivetrain shown in FIG. 5 and equipped with a torque transfer mechanism according to the present invention.

Referring to FIG. 6, torque coupling 302 is schematically illustrated to be operably disposed between drive shaft 30' and rear differential 28. Rear differential 28 includes a pair of side gears 304 that are connected to rear wheels 24 via rear axle shafts 25. Differential 28 also includes pinions 306 that are rotatably supported on pinion shafts fixed to a carrier 308 and which mesh with side gears 304. A right-angled drive mechanism is associated with differential 28 and includes a ring gear 310 that is fixed for rotation with carrier 308 and meshed with a pinion gear 312 that is fixed for rotation with a pinion shaft 314. Torque coupling 302 is schematically shown to include various components of transfer clutch 50 that are operably disposed between drive shaft 30' and pinion shaft 314. In particular, transfer clutch 50 is schematically shown to include main friction clutch 78 and ballramp unit 80 as well as pilot friction clutch 82 and thrust bearing unit 84. Torque coupling 302 also is shown schematically to include clutch actuator 52 that can be adaptively actuated for controlling the magnitude of the clutch engagement force applied to transfer clutch 50 and thus the amount of drive torque transferred from drive shaft 30' to rear differential 28. Actuator 52 includes clutch operator 152 and power unit 154 previously disclosed in FIG. 4 for adaptively controlling actuation of transfer clutch 50. In this regard, power transfer system 44 is hereinafter illustrated in block format and is contemplated to include all electrical and mechanical components and sub-systems required to adaptively control actuation of transfer clutch 50.

Torque coupling 302 permits operation in any of the drive modes previously disclosed. For example, if the on-demand 4WD mode is selected, ECU 58 regulates activation of clutch actuator 52 in response to the operating conditions detected by sensors 54 by controllably varying the electric control signal sent motor 156. Selection of the part-time 4WD mode results in complete engagement of main clutch pack 90 such that pinion shaft 314 is, in effect, rigidly coupled to driveshaft 30'. Finally, in the two-wheel drive mode, main clutch pack 90 is released such that pinion shaft 312 is free to rotate relative to driveshaft 30'. Alternatively, elimination of mode select mechanism 56 would provide automatic adaptive operation of torque coupling 302.

Figure 7:
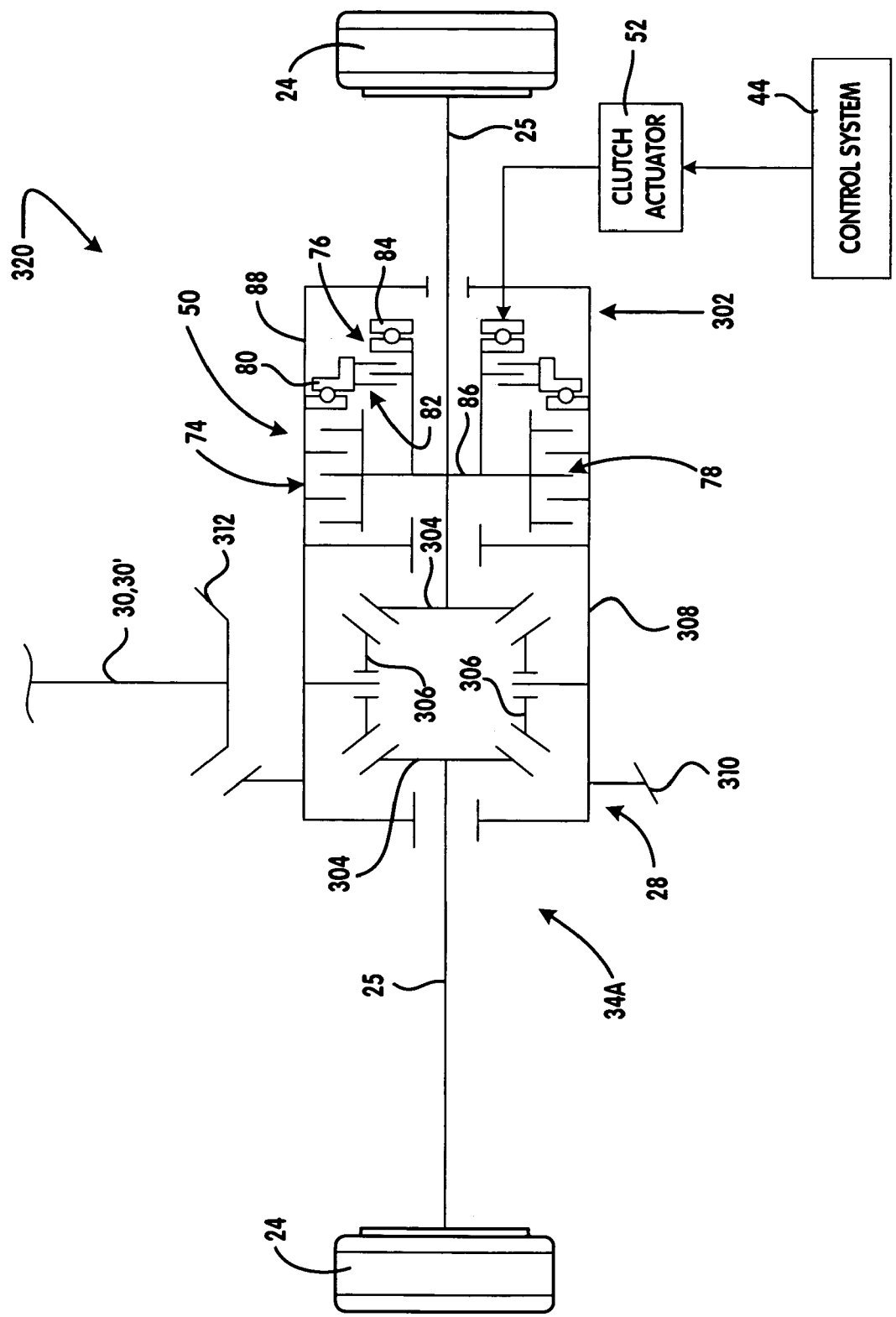
FIG. 7 is a schematic illustration of an alternative drive axle assembly operable for use with either of the drivetrain shown in FIGS. 1 and 5.

The arrangement shown for drive axle assembly 26' of FIG. 6 is operable to provide on-demand four-wheel drive by adaptively controlling the transfer of drive torque from the primary driveline to the secondary driveline. In contrast, a drive axle assembly 320 is shown in FIG. 7 wherein torque coupling 302 is now operably installed between differential case 308 and one of axleshafts 25 to provide an adaptive "side-to-side" torque biasing and slip limiting feature. Torque coupling 302 is schematically shown to again include transfer clutch 50 and clutch actuator 52, the construction and function of which are understood to be similar to the detailed description previously provided herein for each sub-assembly.

Figure 8:
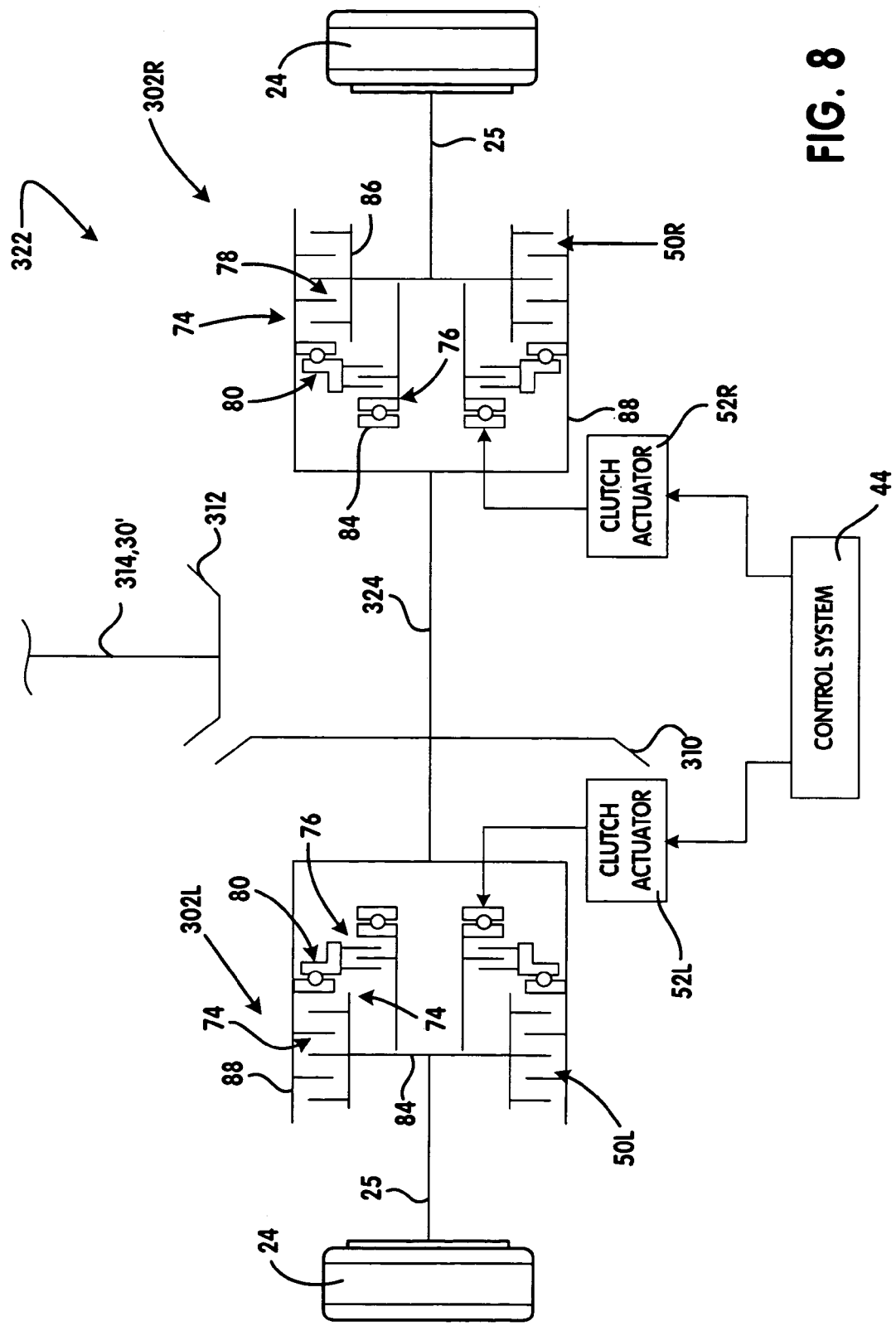
FIG. 8 is a schematic illustration of another alternative embodiment of a power transmission device according to the present invention.

Referring now to FIG. 8, a drive axle assembly 322 is schematically shown to include a pair of torque couplings 302L and 302R that are operably installed between a driven pinion shaft 314 or 30' and axleshafts 25. The driven pinion shaft drives a right-angled gearset including pinion 312 and ring gear 310 which, in turn, drives a transfer shaft 324. First torque coupling 302L is shown disposed between transfer shaft 324 and the left one of axleshafts 25 while second torque coupling 302R is disposed between transfer shaft 324 and the right axle shaft 25. Each torque coupling includes a corresponding transfer clutch 50L, 50R and clutch actuator 52L, 52R. Accordingly, independent torque transfer and slip control is provided between the driven pinion shaft and each rear wheel 24 pursuant to this arrangement.

Figure 9:
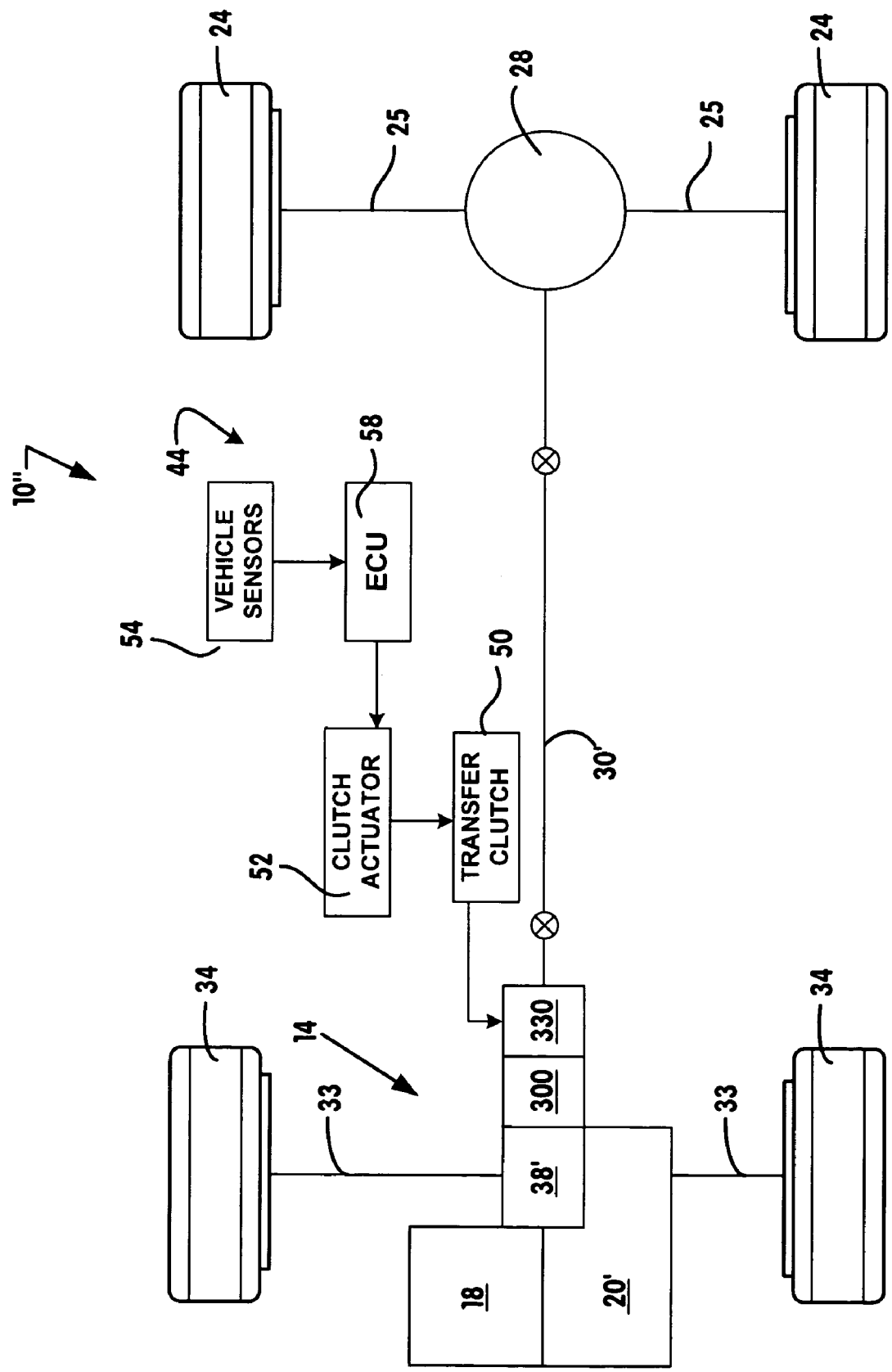
FIG. 9 illustrates another alternative drivetrain arrangement for a four-wheel drive motor vehicle equipped with another power transmission device embodying the present invention.

To illustrate additional alternative power transmission devices to which the present invention is applicable, FIG. 9 schematically depicts a front-wheel based four-wheel drive drivetrain layout 10" for a motor vehicle. In particular, engine 18 drives multi-speed transaxle 20' which has an integrated front differential unit 38' for driving front wheels 34 via axle shafts 33. As before, PTU 300 is also driven by transaxle 20' for delivering drive torque to the input member of a torque transfer coupling 330. The output member of torque transfer coupling 330 is coupled to propshaft 30' which, in turn, drives rear wheels 24 via axleshafts 25. Rear axle assembly 26 can be a traditional driven axle with a differential or, in the alternative, be similar to the drive axle arrangements described in regard to FIGS. 7 or 8. Accordingly, in response to detection of certain vehicle characteristics by sensors 54 (i.e., the occurrence of a front wheel slip condition), power transfer system 44 causes torque coupling 330 to deliver drive torque "on-demand" to rear wheels 24. It is contemplated that torque coupling 330 would be generally similar in structure and function to that of torque transfer coupling 302 previously described herein. As such, its primary components of transfer clutch 50 and clutch actuator 52 are again schematically shown.

Figure 10:
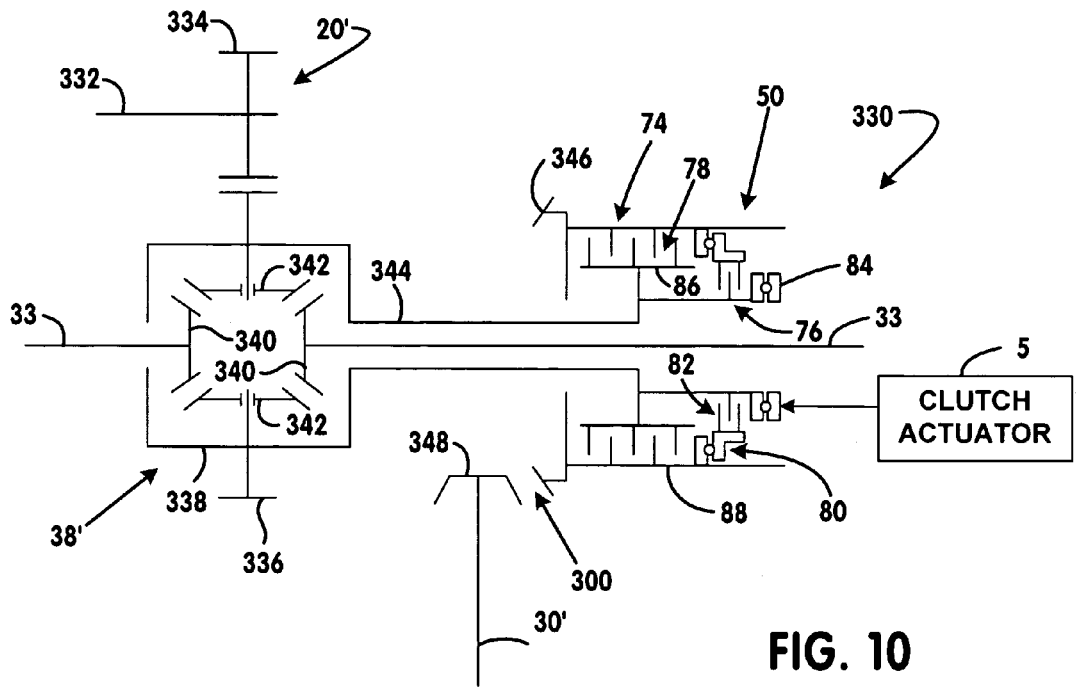
FIGS. 10 through 13 schematically illustrate different embodiments of the power transmission device shown in FIG. 9.

Referring now to FIG. 10, torque coupling 330 is schematically illustrated in association with an on-demand four-wheel drive system based on a front-wheel drive vehicle similar to that shown in FIG. 9. In particular, an output shaft 332 of transaxle 20' is shown to drive an output gear 334 which, in turn, drives an input gear 336 that is fixed to a carrier 338 associated with front differential unit 38'. To provide drive torque to front wheels 34, front differential unit 38' includes a pair of side gears 340 that are connected to front wheels 34 via axleshafts 33. Differential unit 38' also includes pinions 342 that are rotatably supported on pinion shafts fixed to carrier 338 and which are meshed with side gears 340. A transfer shaft 344 is provided for transferring drive torque from carrier 338 to a clutch hub 84 associated with transfer clutch 50. PTU 300 is a right-angled drive mechanism including a ring gear 346 fixed for rotation with drum 88 of transfer clutch 50 and which is meshed with a pinion gear 348 fixed for rotation with propshaft 30'. According to the present invention, the components schematically shown for torque transfer coupling 330 are understood to be similar to those previously described. In operation, drive torque is adaptively transferred on-demand from the primary (i.e., front) driveline to the secondary (i.e., rear) driveline.

Figure 11:
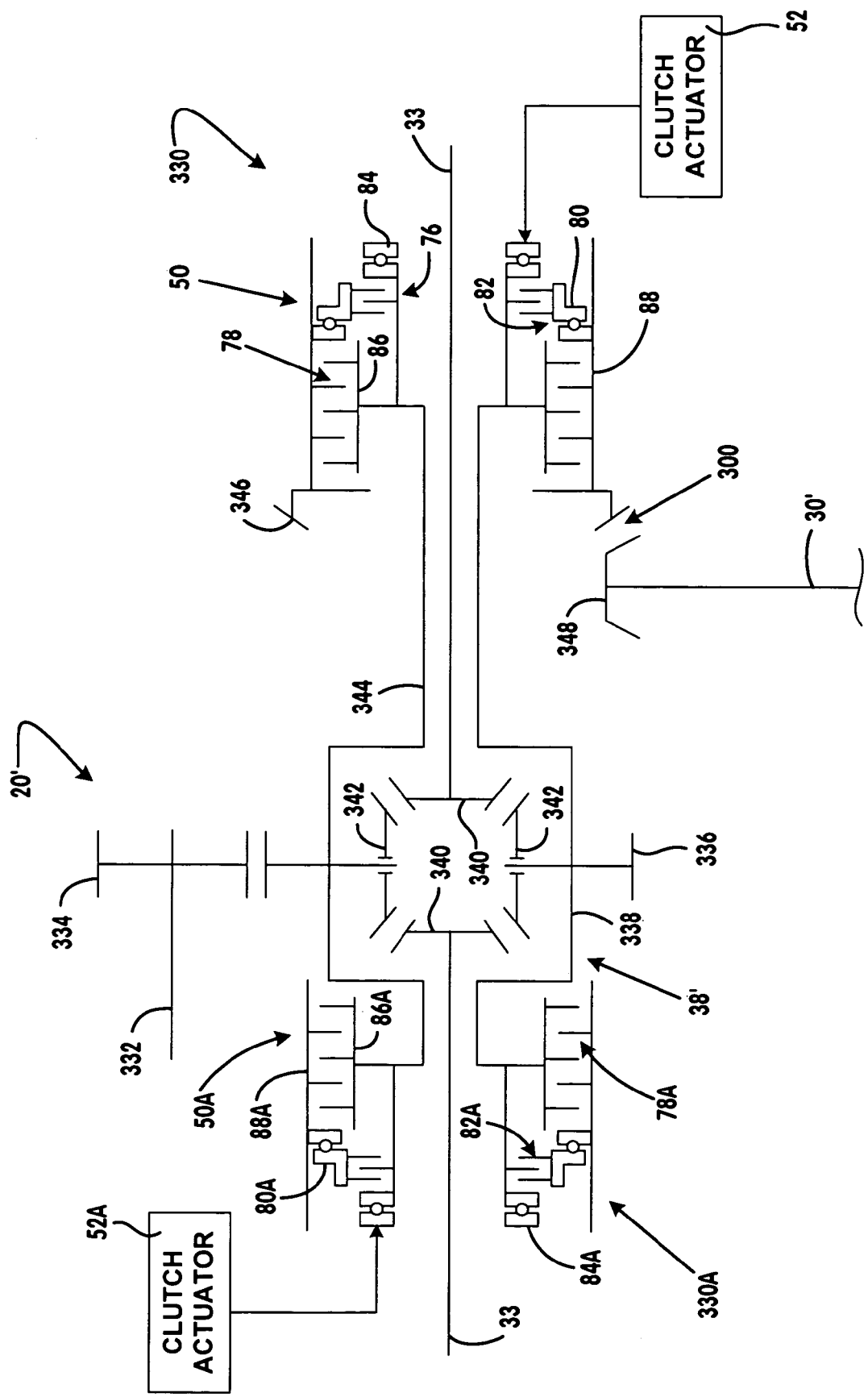

Referring to FIG. 11, a modified version of the power transmission device shown in FIG. 10 is now shown to include a second torque coupling 330A that is arranged to provide a limited slip feature in association with primary differential 38'. As before, adaptive control of torque coupling 330 provides on-demand transfer of drive torque from the primary driveline to the secondary driveline. In addition, adaptive control of second torque coupling 330A provides on-demand torque biasing (side-to-side) between axleshafts 33 of primary driveline 14. As seen, common components of torque coupling 330A are identified with an "A" suffix.

Figure 12:
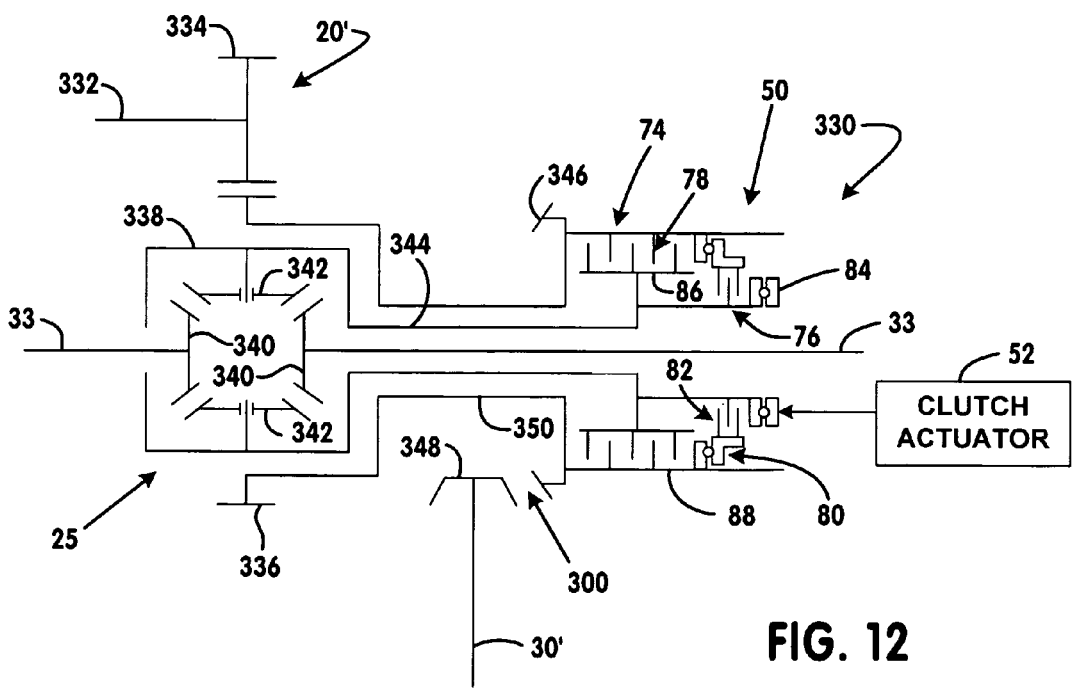

FIG. 12 illustrates another modified version of FIG. 9 wherein an on-demand four-wheel drive system is shown based on a rear-wheel drive motor vehicle that is arranged to normally deliver drive torque to rear wheels 24 while selectively transmitting drive torque to front wheels 34 through a torque coupling 330. In this arrangement, drive torque is transmitted directly from transmission output shaft 332 to power transfer unit 300 via a drive shaft 350 which interconnects input gear 336 to ring gear 346. To provide drive torque to front wheels 34, torque coupling 330 is shown operably disposed between drive shaft 350 and transfer shaft 344. In particular, transfer clutch 50 is arranged such that drum 88 is driven with ring gear 346 by drive shaft 350. As such, clutch actuator 52 functions to transfer drive torque from drum 88 through clutch pack 90 to hub 84 which, in turn, drives carrier 338 of differential unit 38' via transfer shaft 344.

Figure 13:
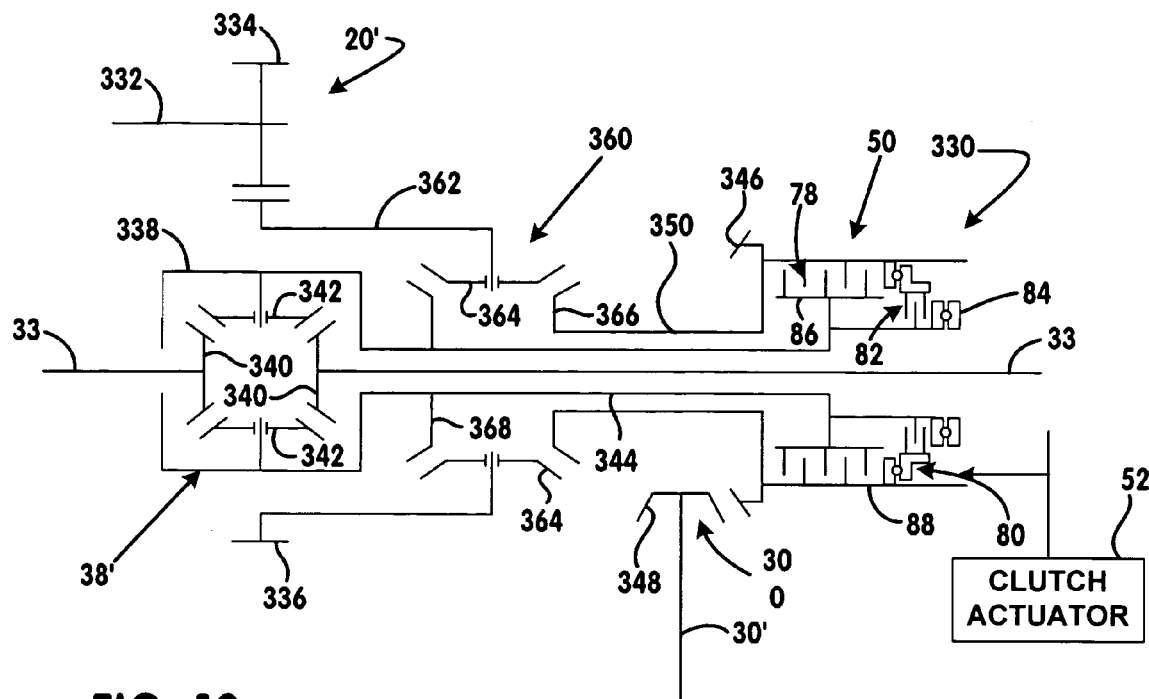

In addition to the on-demand four-wheel drive systems shown previously, the power transmission technology of the present invention can likewise be used in full-time four-wheel drive systems to adaptively bias the torque distribution transmitted by a center or "interaxle" differential unit to the front and rear drivelines. For example, FIG. 13 schematically illustrates a full-time four-wheel drive system which is generally similar to the on-demand four-wheel drive system shown in FIG. 12 with the exception that an interaxle differential unit 360 is now operably installed between carrier 338 of front differential unit 38' and transfer shaft 344. In particular, output gear 336 is fixed for rotation with a carrier 362 of interaxle differential 360 from which pinion gears 364 are rotatably supported. A first side gear 366 is meshed with pinion gears 364 and is fixed for rotation with drive shaft 350 so as to be drivingly interconnected to the rear driveline through power transfer unit 300. Likewise, a second side gear 368 is meshed with pinion gears 364 and is fixed for rotation with carrier 338 of front differential unit 38' so as to be drivingly interconnected to the front driveline. Torque coupling 330 is now shown to be operably disposed between side gears 366 and 368. Torque coupling 330 is operably arranged between the driven outputs of interaxle differential 360 for providing an adaptive torque biasing and slip limiting function between the front and rear drivelines.

Figure 14:
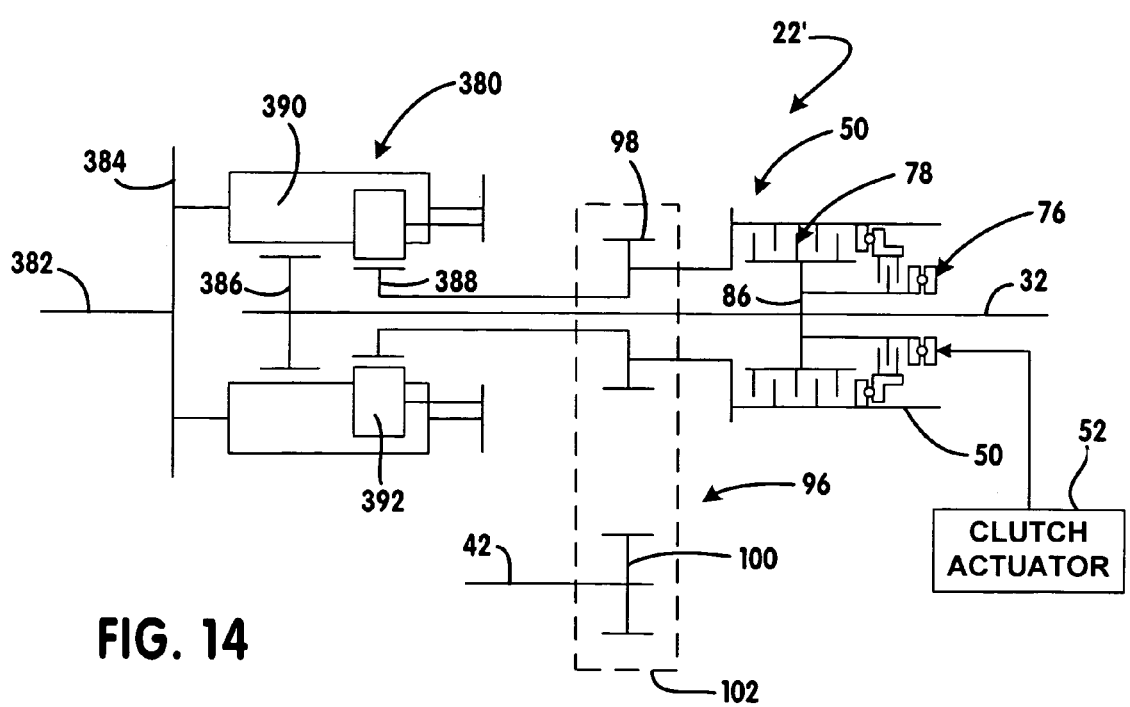
FIG. 14 is a schematic illustration of an alternative construction for the power transmission device shown in FIG. 2.

Referring now to FIG. 14, a full-time 4WD system is shown to include a transfer case 22' which is generally similar to transfer case 22 of FIG. 2 except that an interaxle differential 380 is provided between an input shaft 382 and output shafts 32 and 42. As is conventional, input shaft 382 is driven by the output of transmission 20. Differential 380 includes an input defined as a planet carrier 384, a first output defined as a first sun gear 386, a second output defined as a second sun gear 388, and a gearset for permitting speed differentiation between first and second sun gears 386 and 388. The gearset includes a plurality of meshed pairs of first planet gears 390 and second pinions 392 which are rotatably supported by carrier 384. First planet gears 390 are shown to mesh with first sun gear 386 while second planet gears 392 are meshed with second sun gear 388. First sun gear 386 is fixed for rotation with rear output shaft 32 so as to transmit drive torque to the rear driveline. To transmit drive torque to the front driveline, second sun gear 388 is coupled to transfer assembly 96 which again includes first sprocket 98 rotatably supported on rear output shaft 32, second sprocket 100 fixed to front output shaft 42, and power chain 102.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transmission device comprising:
   a rotary input member adapted to receive drive torque from a source of drive torque;
   a rotary output member adapted to transmit drive torque to an output device;
   a main clutch operably disposed between said input and output members;
   a ballramp unit having a first cam member engageable with said main clutch, a second cam member, and rollers disposed between said first and second cam members;
   a pilot clutch operably disposed between said input member and said second cam member;
   a clutch operator assembly including a mode fork having a first segment engageable with said pilot clutch and a second segment engaging a cam surface on a rotary cam;
   an electric motor for driving said rotary cam such that rotation of said rotary cam in a first direction causes pivotal movement of said mode fork into engagement with said pilot clutch while rotation of said rotary cam in a second direction causes pivotal movement of said mode fork to disengage said pilot clutch; and
   a control system for adaptively controlling actuation of said electric motor.

2. The power transmission device of claim 1 wherein said first cam member of said ballramp unit is axially moveable between first and second positions for applying corresponding minimum and maximum clutch engagement forces to said main clutch, and wherein said first cam member is axially moveable in response to angular movement of said second cam member relative to said first cam member that is caused by a pilot activation force applied by said mode fork to said pilot clutch.

3. The power transmission device of claim 2 wherein said mode fork is operable in a first position to apply a minimum pilot activation force to said pilot clutch so as to permit said first cam member to move to its first position, and wherein said mode fork is operable in a second position to apply a maximum pilot activation force to said pilot clutch so as to permit said first cam member to move to its second position.

4. The power transmission of claim 3 wherein said rotary cam includes a hub segment driven by said electric motor along a motor axis of rotation and an upstanding cam segment defining said cam surface thereon, wherein said second segment of said mode fork includes a follower that engages said cam surface on said cam segment, and wherein the profile of said cam surface on said cam segment is configured to move the follower substantially parallel to said motor axis of rotation to cause pivotal movement of said mode fork toward its second position in response to rotation of said rotary cam by said motor in said first rotary direction and also cause pivotal movement of said mode fork toward its first position in response to rotation of said rotary cam in said second rotary direction.

5. The power transmission device of claim 4 wherein said main clutch includes a first clutch member driven by said input member, a second clutch member driving said output member, and a main clutch pack operably disposed between said first and second clutch members, wherein said pilot clutch includes a pilot clutch pack operably disposed between said second cam member of said ballramp unit and said first clutch member, and a pressure plate engageable with said pilot clutch pack, and wherein an axially moveable thrust member is disposed between said pressure plate and said first segment of said mode fork.

6. The power transmission device of claim 1 wherein said input member is a first shaft in a transfer case and said output member is a second shaft of said transfer case.

7. The power transmission device of claim 1 wherein said input member is driven by a powertrain of a motor vehicle and said output member is connected to a differential unit of a drive axle assembly.

8. The power transmission device of claim 1 defining a drive axle assembly having a differential unit interconnecting a pair of axleshafts, and wherein said input member is a differential carrier of said differential unit, said output member is one of said axleshafts, and said main clutch is arranged to adaptively limit slip between said axleshafts.

9. The power transmission of claim 1 wherein said control system is operable to control the position of said rotary cam to cause said main clutch to transfer a desired magnitude of torque.

10. The power transmission of claim 1 further including an encoder operable to output a signal indicative of the rotary position of said rotary cam to said control system, said rotary position being indicative of the magnitude of torque transferred by said main clutch.

11. A transfer case comprising:
a first shaft;
a second shaft;
a main clutch assembly having a hub coupled for rotation with said first shaft, a drum coupled for rotation with said second shaft, a main clutch pacK having inner clutch plates coupled for rotation with said hub and outer clutch plates coupled for rotation with said drum, and a ballramp unit having a first cam member operable to exert a clutch engagement force on said main clutch pack in response to angular movement of a second cam member; a pilot clutch assembly having a pilot clutch pack with inner clutch plates coupled for rotation with said hub and outer clutch plates coupled for rotation with said second cam member, and a thrust member operable to exert a pilot clutch activation force on said pilot clutch pack;
a clutch operator assembly including a mode fork having a first segment engageable with said thrust member and a second segment engageable with a cam surface on a rotary cam;
an electric motor for driving said rotary cam so as to control pivotal movement of said mode fork and the magnitude of said pilot clutch activation force exerted by said thrust member on said pilot clutch pack; and
a control system for controlling actuation of said electric motor.

12. The transfer case of claim 11 wherein said first cam member of said ballramp unit is axially moveable between first and second positions for applying corresponding minimum and maximum clutch engagement forces to said main clutch pack, and wherein said first cam member is axially moveable in response to angular movement of said second cam member relative to said first cam member caused by said pilot activation force applied by said pilot clutch pack.

13. The transfer case of claim 12 wherein said mode fork is operable in a first position to apply a minimum pilot activation force to said pilot clutch pack so as to permit said first cam member to be located in its first position, and wherein said mode fork is operable in a second position to apply a maximum pilot activation force to said pilot clutch so as to cause said first cam member to move to its second position.

14. The transfer case of claim 13 wherein said rotary cam includes a hub segment driven by said electric motor and an upstanding cam segment defining said cam surface thereon, wherein said second segment of said mode fork includes a follower that engages said cam surface on said cam segment, and wherein the profile of said cam surface on said cam segment is configured to cause pivotal movement of said mode fork toward its second position in response to rotation of said rotary cam by said motor in a first rotary direction and cause pivotal movement of said mode fork toward its first position in response to rotation of said rotary cam in a second rotary direction.

* * * * *